US011006579B2

(12) United States Patent
Kraus

(10) Patent No.: US 11,006,579 B2
(45) Date of Patent: May 18, 2021

(54) AGRICULTURAL HARVESTING MACHINE WITH A MULTIPLE STAGE COMPRESSION SYSTEM

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

(\*) Notice: Subject to any disclaimer, the term of this patent is extended or adjusted under 35 U.S.C. 154(b) by 304 days.

(21) Appl. No.: 16/176,989

(22) Filed: Oct. 31, 2018

(65) Prior Publication Data

US 2020/0128752 A1    Apr. 30, 2020

(51) Int. Cl.
*A01F 15/08* (2006.01)
*A01F 15/07* (2006.01)
(Continued)

(52) U.S. Cl.
CPC ........ *A01F 15/0705* (2013.01); *A01F 15/005* (2013.01); *A01F 15/0825* (2013.01); *A01F 15/10* (2013.01); *A01F 15/14* (2013.01); *A01F 29/10* (2013.01)

(58) Field of Classification Search
CPC ............ A01F 2015/0735; A01F 15/005; A01F 15/0825; A01F 15/10; A01F 15/14; A01F 15/00; A01F 15/02; A01F 15/04; A01F 15/044; A01F 15/046; A01F 15/16; A01F 15/0705; A01F 29/10
See application file for complete search history.

(56) References Cited

U.S. PATENT DOCUMENTS 3,082,588 A    3/1963 Jay et al.
3,185,074 A    5/1965 Jay et al.
(Continued)

FOREIGN PATENT DOCUMENTS

DE    3248066 A1 *  6/1984    ......... A01F 15/0705
EP    0803183 A1    10/1997
GB    2324498 A  * 10/1998    ......... A01F 15/0705

OTHER PUBLICATIONS

European Search Report issued in counterpart European Patent Application No. 19204866.8 dated Mar. 23, 2020 (6 pages).

*Primary Examiner* — Adam J Behrens

(57) ABSTRACT

An agricultural harvesting machine having a multiple stage compression system includes first and second compression systems. The first compression system includes a first compression mechanism which partially compresses the crop material in a compression chamber. The second compression system includes first and second compartments each having at least one open end and positioned rearward of the compression chamber. The second compression system has a first position in which the second compartment is aligned with the compression chamber and the first compartment is operatively positioned with a second compression mechanism. The second compression system has a second position in which the second compartment is operatively positioned with a third compression mechanism and the first compartment is aligned with the compression chamber. The second compression system includes a binding system operatively associated with the second compression mechanism.

19 Claims, 17 Drawing Sheets

(51) Int. Cl.
  *A01F 15/00* (2006.01)
  *A01F 15/10* (2006.01)
  *A01F 15/14* (2006.01)
  *A01F 29/10* (2006.01)

(56) References Cited

U.S. PATENT DOCUMENTS

| | | |
|---|---|---|
| 4,126,089 A | 11/1978 | Oosterling et al. |
| 4,158,994 A | 6/1979 | Jensen |
| 4,202,262 A | 5/1980 | Claas et al. |
| 4,334,466 A | 6/1982 | Spiegelberg |
| 4,651,512 A * | 3/1987 | van der Lely ...... A01F 15/0705 100/88 |
| 4,796,417 A * | 1/1989 | van der Lely ...... A01F 15/0705 100/189 |
| 5,343,670 A | 9/1994 | Gombos et al. |
| 9,351,444 B2 | 5/2016 | Keller |
| 9,750,195 B2 | 9/2017 | Hawes et al. |
| 9,883,632 B2 | 2/2018 | Rizzon et al. |
| 2013/0036921 A1* | 2/2013 | Horstmann ......... A01F 15/0715 100/5 |
| 2015/0272010 A1 | 10/2015 | Lounder et al. |
| 2016/0021825 A1 | 1/2016 | Keller et al. |
| 2016/0021828 A1 | 1/2016 | O'Donnell et al. |
| 2016/0029564 A1 | 2/2016 | Keller et al. |
| 2016/0113206 A1* | 4/2016 | Kraus ................... A01F 15/145 56/433 |
| 2016/0235008 A1 | 8/2016 | Keller |
| 2017/0013784 A1 | 1/2017 | Rizzon et al. |
| 2017/0318750 A1 | 11/2017 | Keller et al. |
| 2019/0223384 A1* | 7/2019 | Frey ................... A01F 15/0825 |

\* cited by examiner

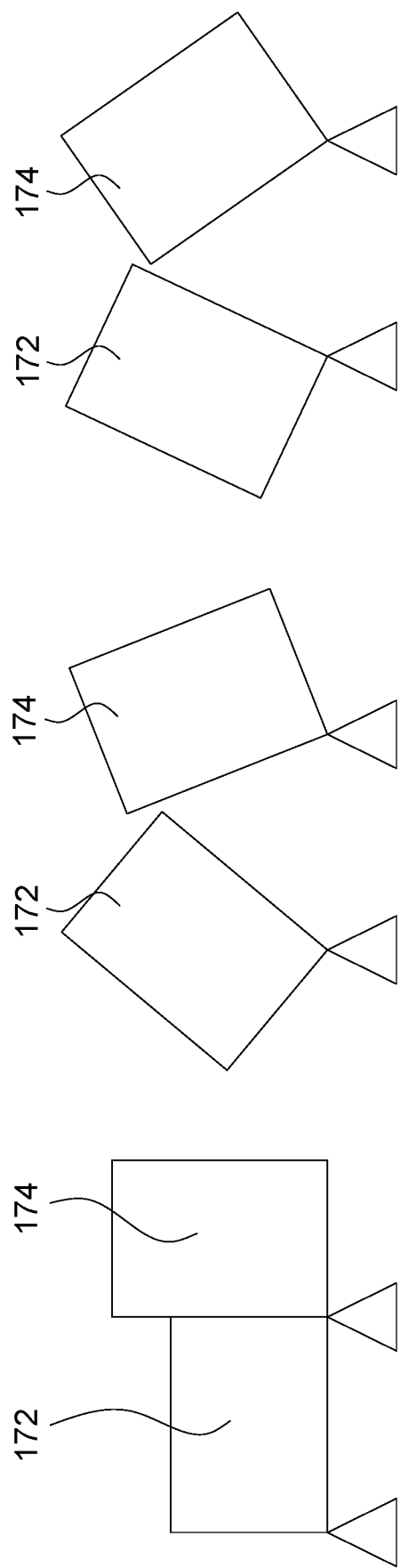
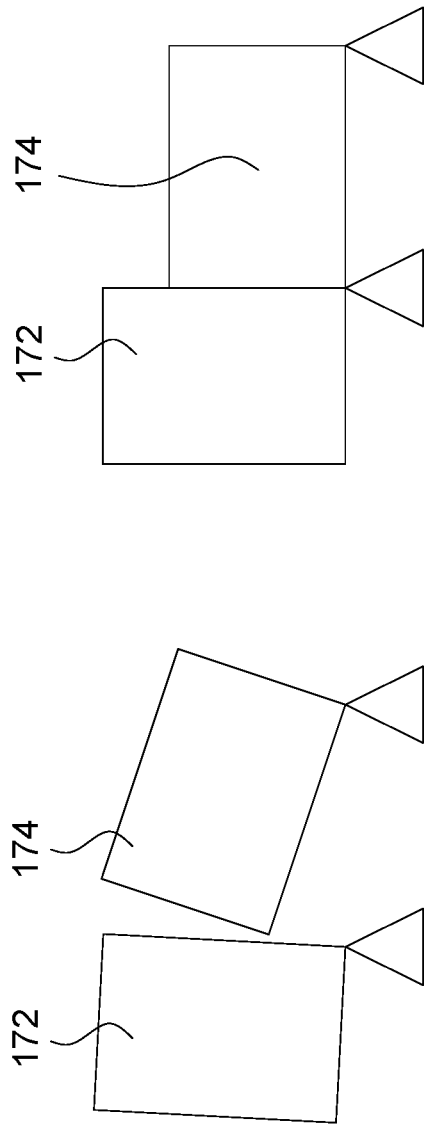
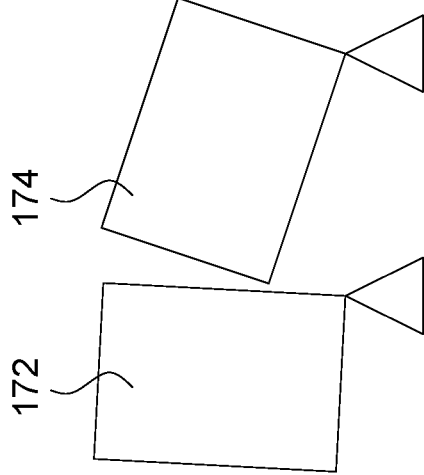

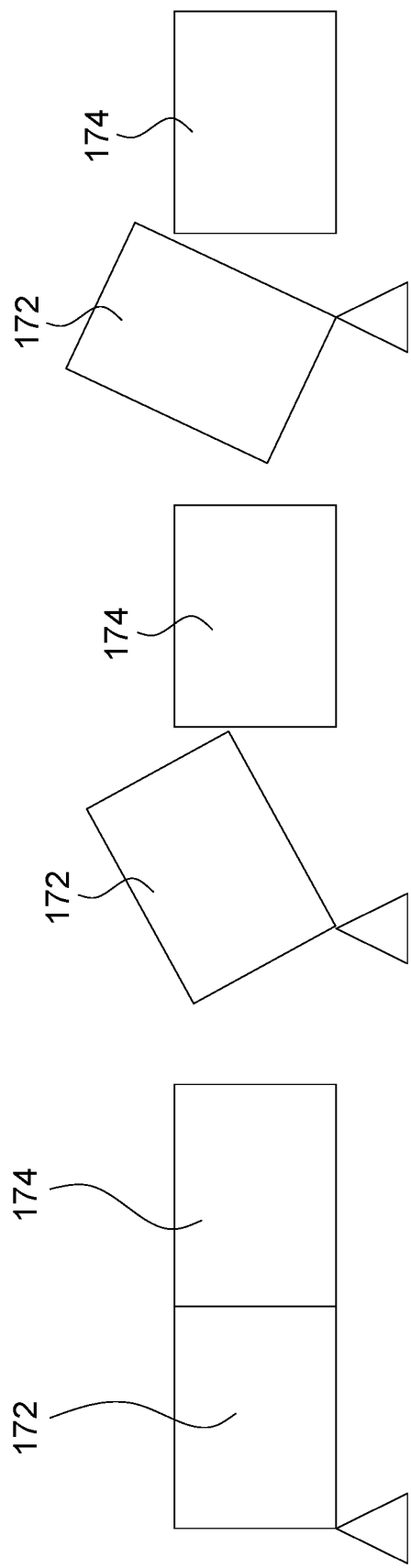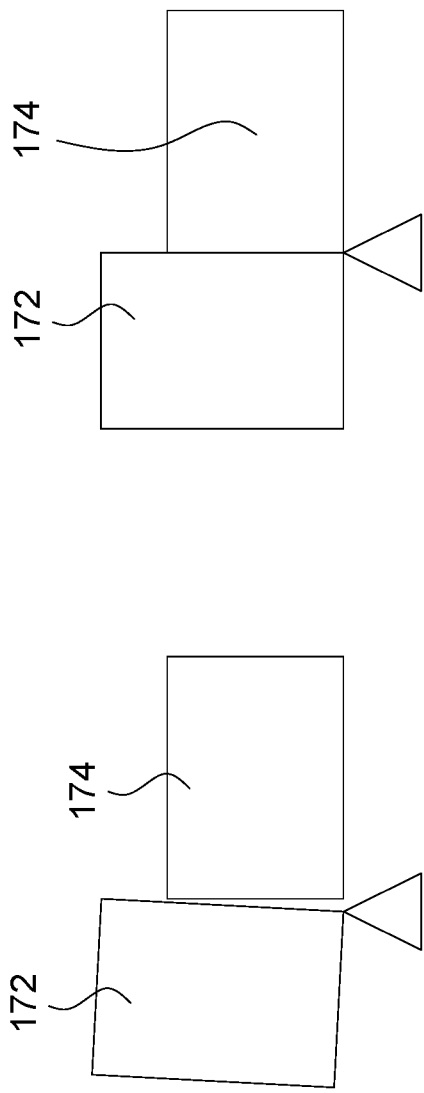

AGRICULTURAL HARVESTING MACHINE WITH A MULTIPLE STAGE COMPRESSION SYSTEM

CROSS-REFERENCE TO RELATED APPLICATIONS

N/A

FIELD OF THE DISCLOSURE

The present disclosure relates to agricultural harvesting machines having multiple compression systems for compressing crop material into a crop package.

BACKGROUND

Agricultural balers gather, compress, and shape crop material into a bale. Different types of balers create different shaped bales. Some balers create rectangular or square bales and others create cylindrical or round bales. Bales can be bound with netting, strapping, wire, or twine. A baler that produces small rectangular bales is often referred to as a square baler. Another type of baler is one that produces large rectangular bales, often referred to as large square baler. Large square balers have been used in crop harvesting for many years. Large square balers densify the crop into large rectangular shaped crop packages or bales, which can minimize shipping and storage costs.

Large square balers usually utilize a compression system including a gearbox with a fixed length crank arm and a fixed length connecting rod connected to a plunger. A pre-compression chamber collects crop prior to moving the crop in front of the plunger to be compressed. During each rotation of the crank arm, the plunger compresses the crop in a baling chamber by extruding the crop though a rectangular chute as the plunger moves towards the rear of the baler. The top and sides of the chute are moveable to change the size of the chute, which varies the density of the crop package. If the size of the chute is expanded or increased, the chute applies less force on the crop decreasing the friction between the chute and the crop and decreasing the density of the crop. If the size of the chute is reduced or decreased, the chute applies more force on the crop increasing the friction between the chute and the crop and increasing the density of the crop.

There is a desire to produce large square bales having increased density to further optimize storage space and transportation costs. These higher density bales result in a fewer number of bales, which can be stored or transported in a reduced area. However, using a conventional plunger to achieve higher densities causes high compressive forces resulting in increasing the size and strength of the flywheel, drive components, and the plunger. This results in higher weight and costs. Additional power is also required to compress the crop to the higher density in the limited amount of time during the compression stroke and to compensate for the large amounts of energy wasted due to friction.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a multiple stage compression system which compresses crop material in an agricultural harvesting machine in two or more compression systems.

According to an aspect of the present disclosure, an agricultural harvesting machine can have a pickup mechanism which gathers a crop material from an associated ground surface. The agricultural harvesting machine can include a multiple stage compression system having a first compression system with a first compression mechanism which partially compresses the crop material in a compression chamber received from the pickup mechanism and a second compression system with first and second compartments each having at least one open end and positioned rearward of the compression chamber. The second compression system has a first position in which the second compartment is aligned with the compression chamber and the first compartment is operatively positioned with a second compression mechanism. The second compression system has a second position in which the second compartment is operatively positioned with a third compression device and the first compartment is aligned with the compression chamber. The second compression system further includes a binding system operatively associated with the second compression mechanism.

In some implementations, the first and second compartments can move together as a unit or independently of each other. The first and second compartments can move perpendicular to the direction of crop material exiting the compression chamber between the first and second positions. The first and second compartments can remain adjacent to each other in both the first and second positions. The compression chamber and the first and second compartments can all be positioned in the same horizontal or vertical plane. The second compression mechanism includes a stationary barrier and at least one actuator which moves a moveable barrier towards the stationary barrier to compress the crop material in the first compartment. The first binding system binds the compressed crop material in the first compartment into a crop package with a higher density than the crop material exiting the compression chamber. The agricultural harvesting machine further includes at least one actuator operably connected to one of the first and second compartments to move the first and second compartments between the first and second positions. The agricultural harvesting machine may further include a controller configured to control the one or more operations of the first and second compression systems.

According to an aspect of the present disclosure, a method of compressing crop material in an agricultural harvesting machine may include one or more of the following processes or steps: gathering a crop material with a pickup mechanism from an associated ground surface; compressing the crop material in a compression chamber received from the pickup mechanism; transferring the crop material from the compression chamber to a first compartment; replacing the first compartment with a second compartment by moving the compartments in a transverse or lateral direction perpendicular to the direction of crop material exiting the compression chamber, the compartments each having at least one open end; transferring the crop material from the compression chamber to the second compartment while concurrently or simultaneously further compressing the crop material in the first compartment; and binding the crop material in the first compartment.

The method may further include replacing the first compartment with a second compartment when the first compartment has attained a predetermined fill condition. The method may further include binding the further compressed crop material in the first compartment into a crop package with a higher density than the crop material exiting the compression chamber. The method may further include replacing the second compartment with the first compartment by moving the compartments in a transverse or lateral direction perpendicular to the direction of crop material exiting the compression chamber after binding the crop material in the first compartment.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIGS. 4A-E are a series of schematic diagrams showing an operation of the bale densification system, according to an embodiment;

FIGS. 5A-E are a series of schematic diagrams showing an operation of the bale densification system, according to an embodiment;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
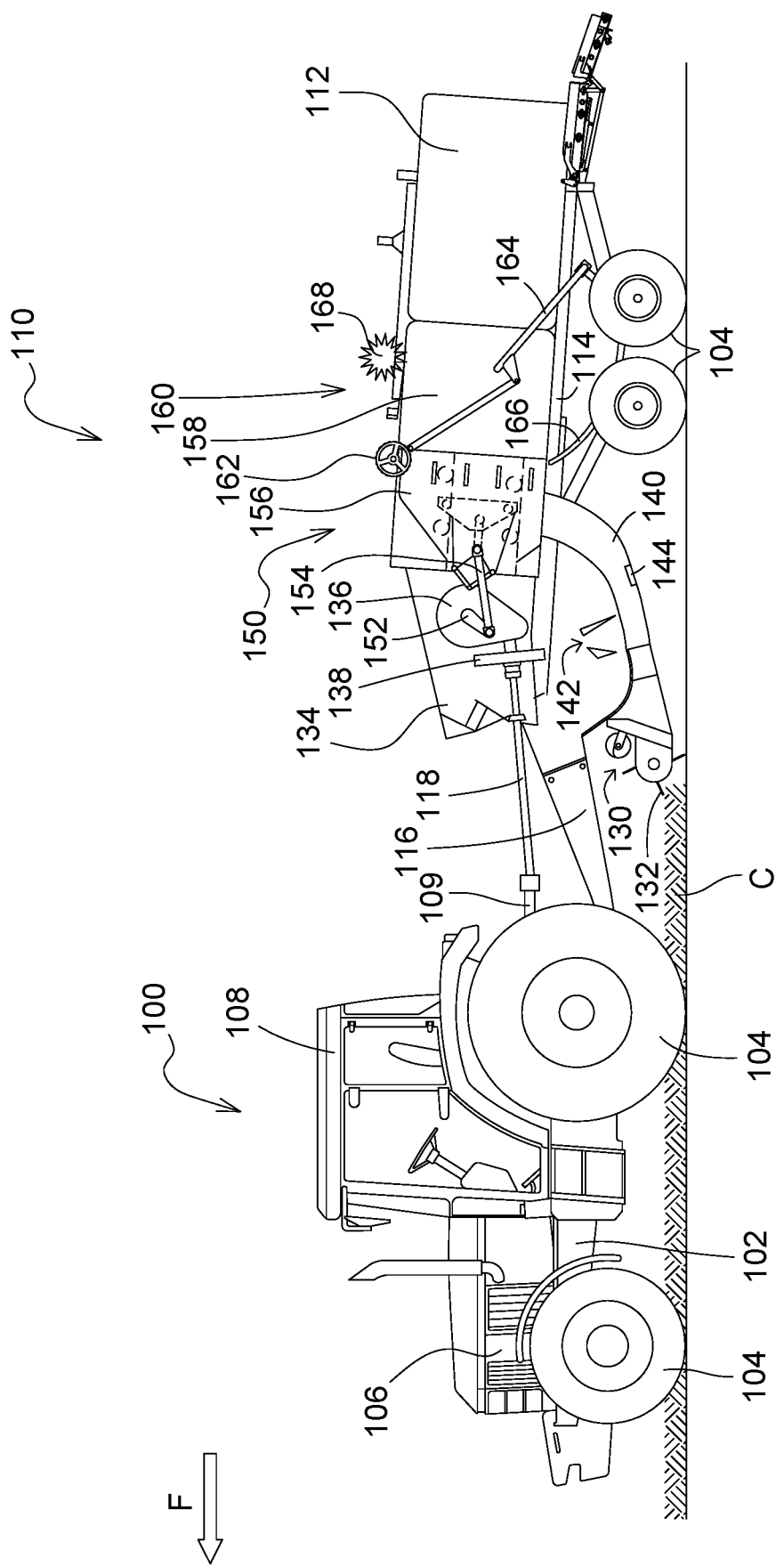
FIG. 1 is a perspective view of an agricultural vehicle coupled to an agricultural harvesting machine, according to an embodiment.

FIG. 1 illustrates an agricultural vehicle 100, for example a tractor, coupled to an agricultural harvesting machine 110, for example a large square baler. This disclosure also applies to other types of balers and harvesting machines. The agricultural harvesting machine 110 may be coupled to an agricultural vehicle 100, as depicted, or the agricultural harvesting machine 110 may be self-propelled. The agricultural harvesting machine 110 may be combined or integrated with a cotton harvester, a combine, or other harvesting machines. The agricultural vehicle 100 and the agricultural harvesting machine 110 may each include an electronic control unit or controller, which will be discussed in more detail below. Merely for convenience, the description will refer to the agricultural vehicle 100 as a tractor and the agricultural harvesting machine 110 as a baler. The tractor 100 can include a frame or chassis 102, one or more ground engaging apparatus 104, such as wheels or tracks, a power source 106, such as an engine, an operator cabin 108, and a power-take-off (PTO) output 109.

As depicted in FIG. 1, the baler 110 can move across a field in a forward direction of travel F along a longitudinal axis of the baler 110 gathering and processing crop material C to form a crop package 112, such as a bale. The baler 110 may then eject the crop package 112 from the rear of the baler 110. The baler 110 can include a frame 114, ground engaging apparatus 104, such as wheels or tracks, a drawbar 116 for attachment to a tractor 100 or other vehicle, and an input shaft 118, such as a power-take-off (PTO) shaft, which can receive rotational power from a tractor 100, other vehicle agricultural vehicles, or other external or internal power sources.

Figure 2:
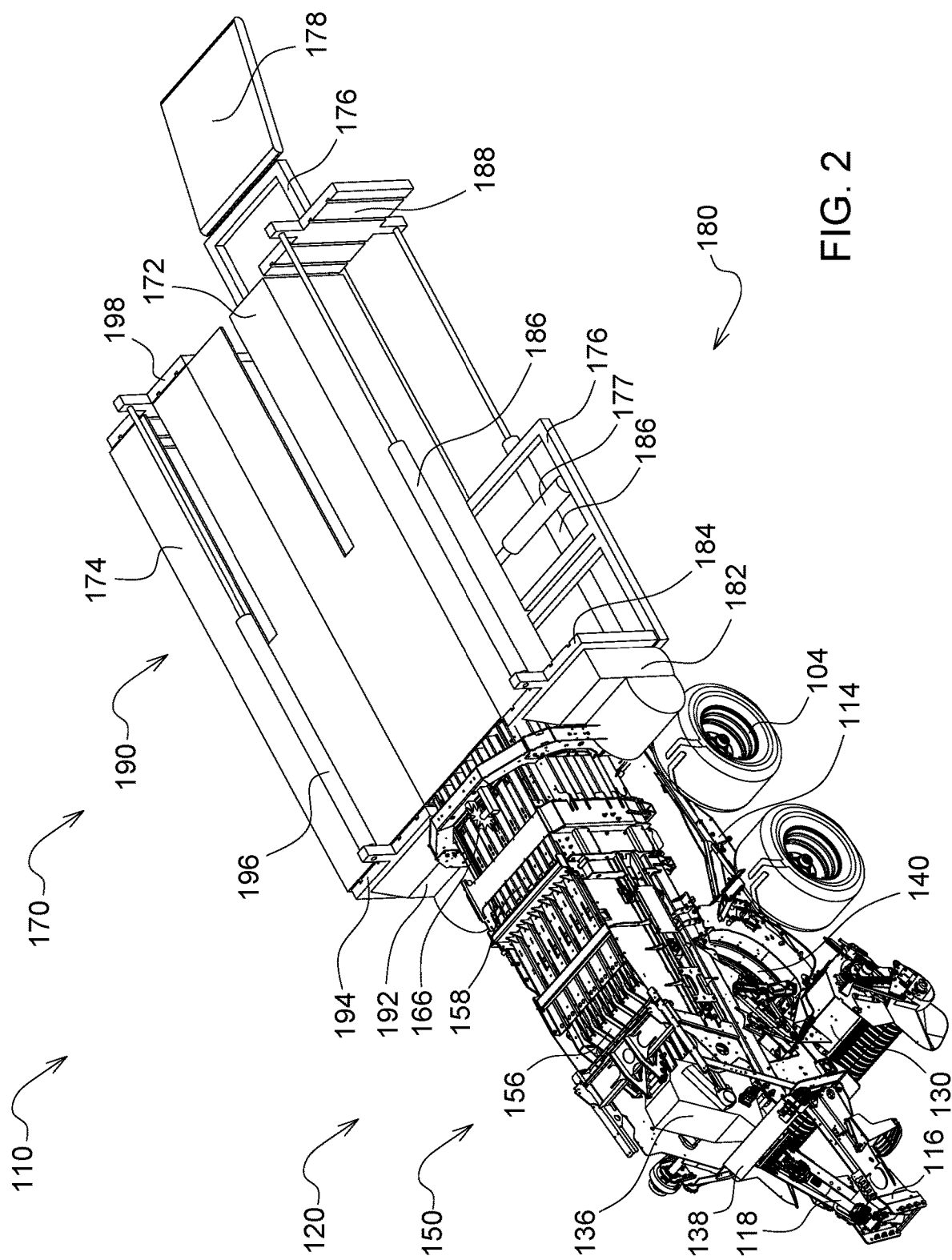
FIG. 2 is a front perspective view of an agricultural harvesting machine, according to an embodiment.

FIG. 2 illustrates a baler 110 having a multiple stage compression system which includes a first stage compression system or crop package formation system 120 and a second stage compression system or crop package densification system 170. The first stage compression system 120 at least partially compresses and forms the crop material. The second stage compression system 170 further compresses the crop material to the final selected or predetermined density, shape, and size. The multiple stage compression system can create higher density bales than a single or one stage compression system.

With reference to FIGS. 1 and 2, the baler 110 can include a pick-up mechanism 130 which gathers crop material from the ground surface and feeds it into the baler 110. The pick-up mechanism 130 in the first stage compression system 120 is optional and in some implementations, the baler 110 does not include a pick-up mechanism 130. The pick-up mechanism 130 can include various pick-up apparatus 132 including, but not limited to, tines, forks, augers, conveyors, baffles, a cutter or pre-cutter assembly, or any combination of the preceding. The baler 110 can include a housing 134, which generally shields various internal components of the baler 110. The input shaft or PTO shaft 118 may connect to an input of the gear train or transmission 136 providing rotational power to the baler 110 from the tractor 100 or other associated vehicle or power source. The transmission 136 can include a gearbox which converts the rotational motion of the input shaft 118 along a generally longitudinal axis of the baler 110 to a rotational motion along a generally lateral or transverse axis of the baler 110. A flywheel 138 may connect to the input shaft 118, the transmission 136, or both. The flywheel 138 can be positioned between the transmission 136 and the input shaft 118, as shown.

The baler 110 can include a pre-compression chamber 140 which receives crop material from the pick-up mechanism 130 and accumulates the crop material until a pre-determined fill condition. The pre-compression chamber 140 in the first stage compression system 120 is optional and in some implementations, the baler 110 does not include a pre-compression chamber 140. A loading mechanism 142, or stuffer, moves crop material into the pre-compression chamber 140. The loading mechanism 142 can include projections, for example tines or forks, which are inserted or extended into the pre-compression chamber 140, at or near the entrance, to move crop material into and through the pre-compression chamber 140. The projections can then be removed or retracted from the pre-compression chamber 140, at or near the exit, and repositioned at or near the entrance of the pre-compression chamber 140. The pre-compression chamber 140 can include an accumulation phase and a loading phase. During the accumulation phase, the loading mechanism 142 moves crop material provided by the pick-up mechanism 130 into the pre-compression chamber 140 until the pre-compression chamber 140 reaches a pre-determined fill condition. During the loading phase, the loading mechanism 142 moves crop material from the pre-compression chamber 140 into a compression chamber 158. The baler 110 can include one or more compression chambers 158.

The baler 110 can include a trip mechanism 144 to determine when the pre-determined fill condition of the pre-compression chamber 140 has been attained. The trip mechanism 144 can activate the loading phase of the loading mechanism to move crop material from the pre-compression chamber 140 into a compression chamber 158. The trip mechanism 144 can include mechanical devices, sensors, or both. The trip mechanism 144 can include one or more trip plates movably positioned at least partially within the pre-compression chamber 140. The trip mechanism 144 may move in response to crop material filling the pre-compression chamber 140 until the pre-determined fill condition is attained. The baler 110 can include a sensor to determine the position of the trip mechanism 144. Alternatively, or additionally, one or more sensors can be positioned at any location to sense the fill condition within the pre-compression chamber 140. The sensor could be positioned on the loading mechanism 142 including, but not limited to, on one or more of the projections. The one or more sensors can detect or sense at least one of load, force, displacement, position, rotation, density, and pressure corresponding to the fill condition of the pre-compression chamber 140.

The baler 110 can include a compression mechanism 150 having a crank arm 152 connected to the rotational output of the transmission 136. The compression mechanism 150 can include a connecting link 154 connected between the crank arm 152 and a compression device or plunger 156. The connecting link 154 can include one or more members connecting the crank arm 152 to the plunger 156. The crank arm 152 rotates based upon the output of the transmission 136, and the plunger 156 moves in a reciprocal motion as the crank arm 152 rotates. The baler 110 can include a sensor to detect or sense one or more of the rotational speed, position, or orientation of the crank arm 152. The plunger 156 extends into the compression chamber 158 compressing the crop material and at least partially retracts from the compression chamber 158 to allow more crop material to enter the compression chamber 158. The baler 110 can include a sensor to detect or sense one or more of the position, direction, and speed of the plunger 156. Alternatively, or additionally, the compression mechanism 150 can include one or more augers or other compression or density increasing devices or apparatus.

The baler 110 can include a binding system 160, for example a banding, strapping, or knotter system, which binds the compressed crop material in the compression chamber 158 into a crop package 112, such as a bundle or bale. The binding system 160 in the first stage compression system 120 is optional and in some implementations, the baler 110 does not include the binding system 160. The binding system 160 can include one or more binding or knotter assemblies 162, a needle yoke 164, and one or more binding material needles 166, which can deliver binding material to the binding assemblies. The binding system 160 wraps and secures a binding material around the compressed crop material during a binding operation. The baler 110 can include a sensor to detect or sense the status of the binding system 160, for example when the binding operation is commenced and completed. The baler 110 can include a measuring device 168, such as a star wheel, which measures the quantity, for example the length, of the compressed crop material within the compression chamber 158. The baler 110 can include a sensor to detect or sense when the measuring device 168 has determined the compressed crop material has reached the desired quantity.

The measuring device 168 can activate the binding system 160 when the compressed crop material within the compression chamber 158 reaches a desired mass, weight, size, or length. The measuring device 168 may activate the binding assembly 160 directly or via a mechanical or electrical trip assembly. The one or more binding material needles 166 may each move from a lowered position generally below or underneath the baler 110 to a raised position passing through the compression chamber 158 up to the binding assembly 160. The one or more needles 166 may deliver binding material, for example string, twine, bands, or straps, to the binding assembly 162, which secures the binding material around the compressed crop material within the compression chamber 158.

As depicted in FIG. 2, the first stage compression system 120 includes a pick-up mechanism 130, a pre-compression chamber 140, a compression mechanism 150, and related or associated components. The first stage compression system 120 at least partially compresses the crop material in the compression chamber 158 received from the pick-up mechanism 130 directly or via the pre-compression chamber 140. The first stage compression system 120 at least partially compresses and forms the crop material into a desired bale shape. The first stage compression system 120 may compress the crop material to approximately fifty percent or half of the final desired density. Alternatively, the first stage compression system 120 may compress the crop material to more than or less than half of the final desired density. The first stage compression system 120 then transfers or conveys the at least partially formed or shaped crop material to the second stage compression system 170, which further compresses the crop material and then bands, straps, or otherwise binds the crop material. The first stage compression system 120 may either bind the crop material before transferring it to the second stage compression system 170 or transfer the crop material to the second stage compression system 170 without binding.

Figure 3:
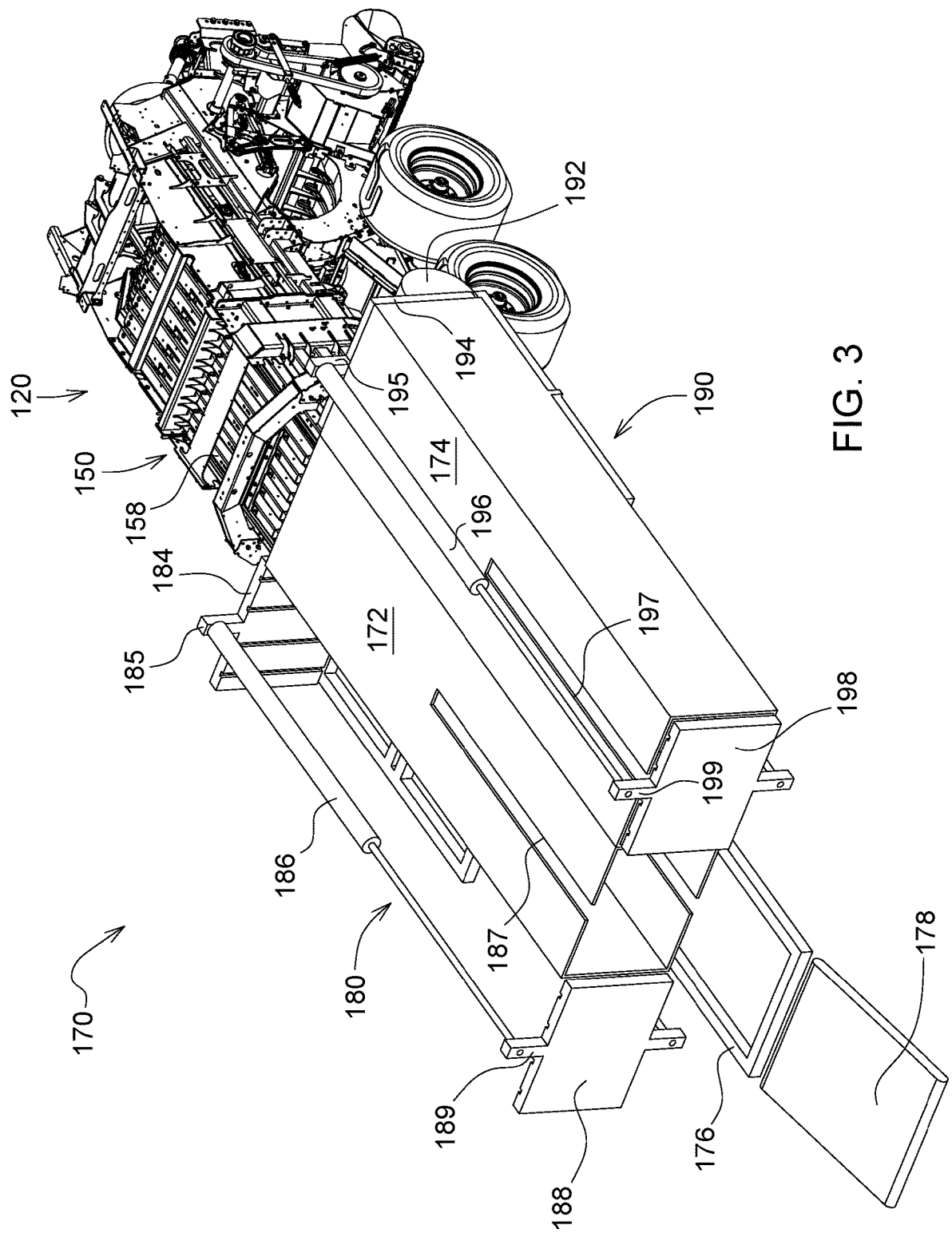
FIG. 3 is a rear perspective view of a bale densification system, according to an embodiment.

As depicted in FIGS. 2 and 3, the second stage compression system 170 can include one or more compartments, for example first and second compartments 172, 174, which can be adjacent to each other. The first and second compartments 172, 174 can each be a rectangular cuboid shaped container with open ends at the inlet or entrance and the outlet or exit. The first compartment 172 can include one or slots 187 in the top, the bottom, or both. The second compartment 174 can include one or slots 197 in the top, bottom, or both. The first and second compartments 172, 174, can be connected or coupled to each other. The first and second compartments 172, 174, can be positioned adjacent or beside each other and can move together as a unit. The first and second compartments 172, 174 can be fixed to each other and maintain this side by side relationship throughout the operation of the second stage compression system 170. Alternatively, the first and second compartments 172, 174 can move independently of each other with each of the compartments moving linearly, curvilinearly, rotationally, or any combination of the preceding motions. The compression chamber and first and second compartments 172, 174 can all be positioned in the same horizontal plane, with the compartments positioned beside each other, or in the same vertical plane, with the compartments positioned one above the other. Alternatively, one of the compartments could be positioned on a side of the baler 110 and the other could be positioned above or below the baler 110. The second stage compression system 170 can include a supporting frame or structure 176 and a rear ramp or inclined surface 178. Any type actuator 177 can be connected or coupled to the frame 176 and at least one of the first and second compartments 172, 174 to move the first and second compartments 172, 174 transversely or laterally relative to the frame 176. For example, a first portion of the actuator 177 can be attached to the frame 176 and a second portion of the actuator 177 can be attached to one of the first and second compartments 172, 174. The actuator 177 can then move the first and second compartments 172, 174 left and right, in a linear or curvilinear path, and perpendicular relative to the direction of crop material exiting the compression chamber 158.

The second stage compression system 170 can include a compression mechanism 180 having a binding system 182, a stationary barrier or wall 184, one or more compression devices 186, for example hydraulic, electric, linear, pneumatic, or any other types of actuators, and a movable barrier or wall 188. The stationary wall 184 can include one or more extensions 185, which provide an attachment location for the compression device 186. The movable wall 188 can include one or more extensions 189, which provide an attachment location for the compression device 186. The stationary wall 184 can be positioned adjacent the binding system 182 near the forward portion of the compression mechanism 180. The one or more compression devices 186 can move the movable wall 188 towards and away from the stationary wall 184. The one or more extensions 189 of the movable wall 188 can travel through the one or more slots 187 in the first compartment 172 as the one or more compression devices 186 extend and retract and the moveable wall 188. In a first position, the first compartment 172 can be aligned or operatively associated with the compression chamber 158 to receive at least partially compressed crop material from the compression chamber 158. In a second position, the first compartment 172 can be aligned or operatively associated with the compression mechanism 180 such that the stationary wall 184 and the movable wall 188 are positioned at the ends of the first compartment 172. The one or more compression devices 186 move the movable wall 188 towards the stationary wall 184 further compressing the crop material to the desired or selected density. The binding system 182 then bands, straps, or otherwise binds the compressed crop material in the first compartment 172.

The second stage compression system 170 can include a second compression mechanism 190 having a binding system 192, a stationary barrier or wall 194, one or more compression devices 196, for example any type of actuators, and a movable barrier or wall 198. The stationary wall 194 can include one or more extensions 195, which provide an attachment location for the compression device 196. The movable wall 198 can include one or more extensions 199, which provide an attachment location for the compression device 196. The stationary wall 194 can be positioned adjacent the binding system 192 near the forward portion of the compression mechanism 190. The one or more compression devices 196 can move the movable wall 198 towards and away from the stationary wall 194. The one or more extensions 199 of the movable wall 198 can travel through the one or more slots 197 in the second compartment 174 as the one or more compression devices 196 extend and retract and the moveable wall 198. In a first position, the second compartment 174 can be aligned or operatively associated with the compression chamber 158 to receive at least partially compressed crop material from the compression chamber 158. In a second position, the second compartment 174 can be aligned or operatively associated with the compression mechanism 190 such that the stationary wall 194 and the movable wall 198 are positioned at the ends of the second compartment 174. The one or more compression devices 196 move the movable wall 198 towards the stationary wall 194 further compressing the crop material to the desired or selected density. The binding system 192 then bands, straps, or otherwise binds the compressed crop material in the second compartment 174. The first and second compression mechanisms 180, 190 can be positioned on the sides of the baler 110, on the top and bottom of the baler 110, or any combination of the preceding.

With reference to FIGS. 4A-E, both the first and second compartments 172, 174 can move independent of each other. The movement of the first and second compartments 172, 174 can be coordinated or synchronized with the motion of each compartment is independent of the other. In FIG. 4A, the first compartment 172 is aligned with the compression chamber 158 and the second compartment 174 is aligned with the second compression mechanism 180. FIGS. 4B-4D show the first and second compartments 172, 174 moving independently with both compartments rotating from the first position to the second position. The first compartment 172 repositions to be aligned with the third compression mechanism 190 and the second compartment 174 repositions to be aligned with the compression chamber 158, as shown in FIG. 4E.

With reference to FIGS. 5A-E, both the first and second compartments 172, 174 can move independent of each other. The movement of the first and second compartments 172, 174 can be coordinated or synchronized with motion of each compartment is independent of the other. In FIG. 5A, the first compartment 172 is aligned with the compression chamber 158 and the second compartment 174 is aligned with the second compression mechanism 180. In FIGS. 5B-5D, the first and second compartments 172, 174 move independently with one of the compartments, for example the first compartment 172, rotating or revolving and the other compartment, for example the second compartment 174, moving or transitioning linearly from the first position to the second position. The first compartment 172 repositions to be aligned with the third compression mechanism 190 and the second compartment 174 repositions to be aligned with the compression chamber 158, as shown in FIG. 5E.

Figure 6:
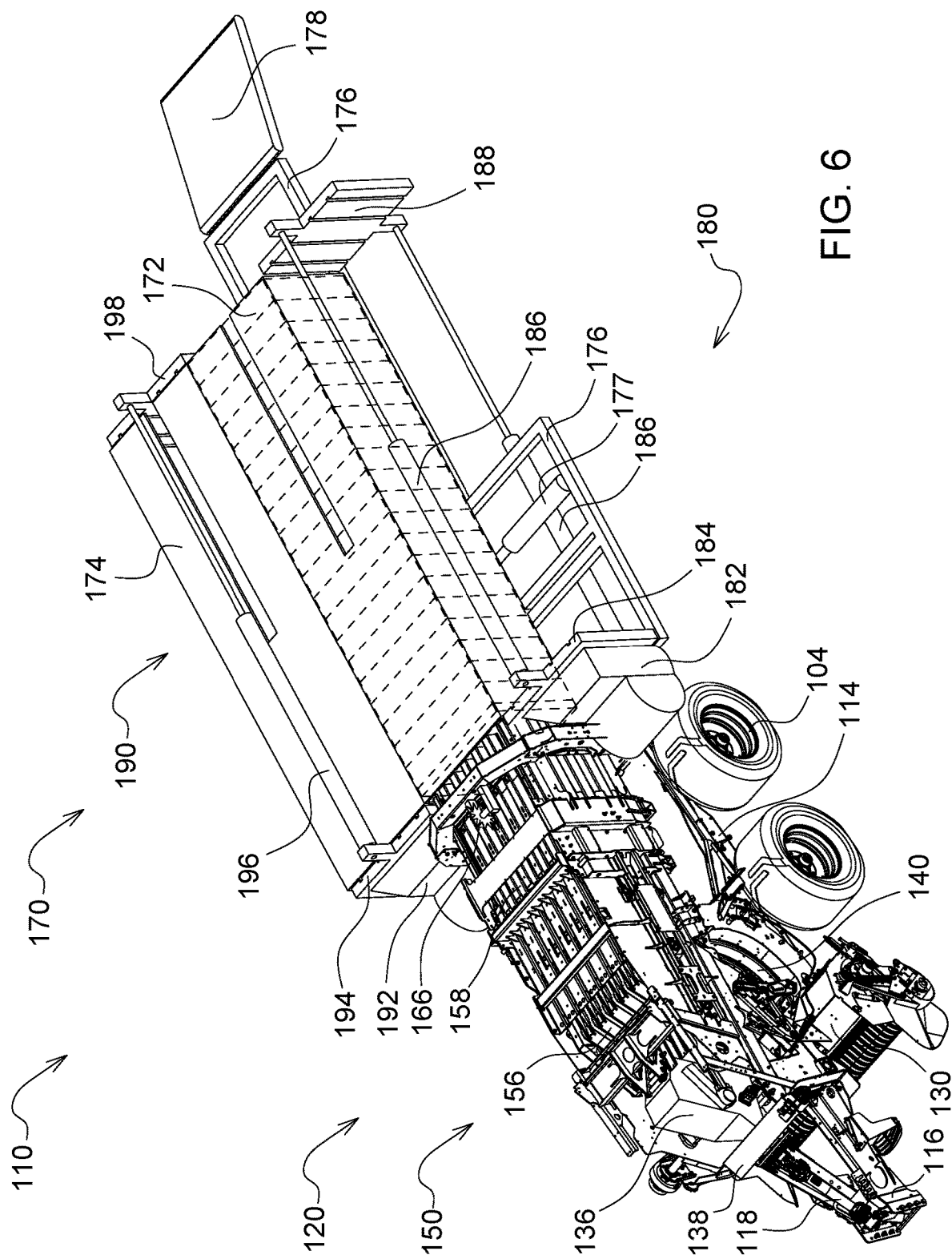
FIG. 6 is a front perspective view of an agricultural harvesting machine, according to an embodiment.
Figure 7:
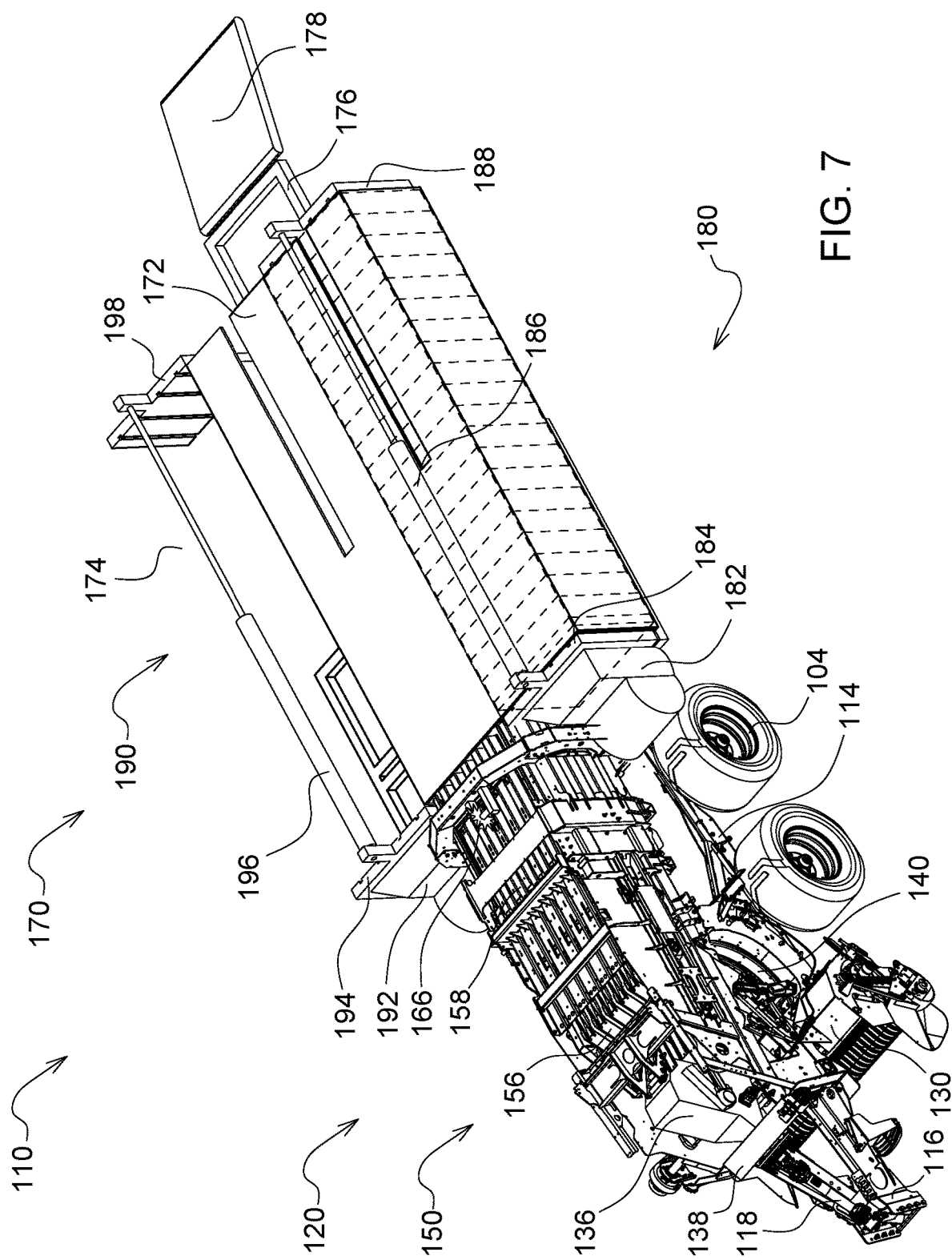
FIG. 7 is a front perspective view of an agricultural harvesting machine, according to an embodiment.

With reference to FIGS. 5-13, the baler 110 can produce high or higher density bales via the multiple stage compression system having first and second stage compression systems 120, 170. In FIG. 5, the first stage compression system 120 forms the crop material into bale form and at least partially compresses the crop material in the compression chamber 158. The first compartment 172 is aligned or operatively associated with the compression chamber 158 and crop material exits or transfers from the compression chamber 158 into the first compartment 172 until a desired or predetermined fill level or condition. The second compartment 174, depicted as empty, is aligned or operatively associated with the compression mechanism 190. When the first compartment 172 has been filled, the first and second compartments 172, 174 move or transfer to the left, in a linear or curvilinear path, so that the first compartment 172 is aligned or operatively associated with the compression mechanism 180 and the second compartment 174 is aligned or operatively associated with the compression chamber 158, as shown in FIG. 6. The second compartment 174 replaces the first compartment 172 behind the compression chamber 158. The crop material exiting the compression chamber 158 begins to fill the second compartment 174, and the one or more compression devices 186 move the movable wall 188 towards the stationary wall 184 compressing the crop material in the first compartment 172, as shown in FIG. 7.

Figure 8:
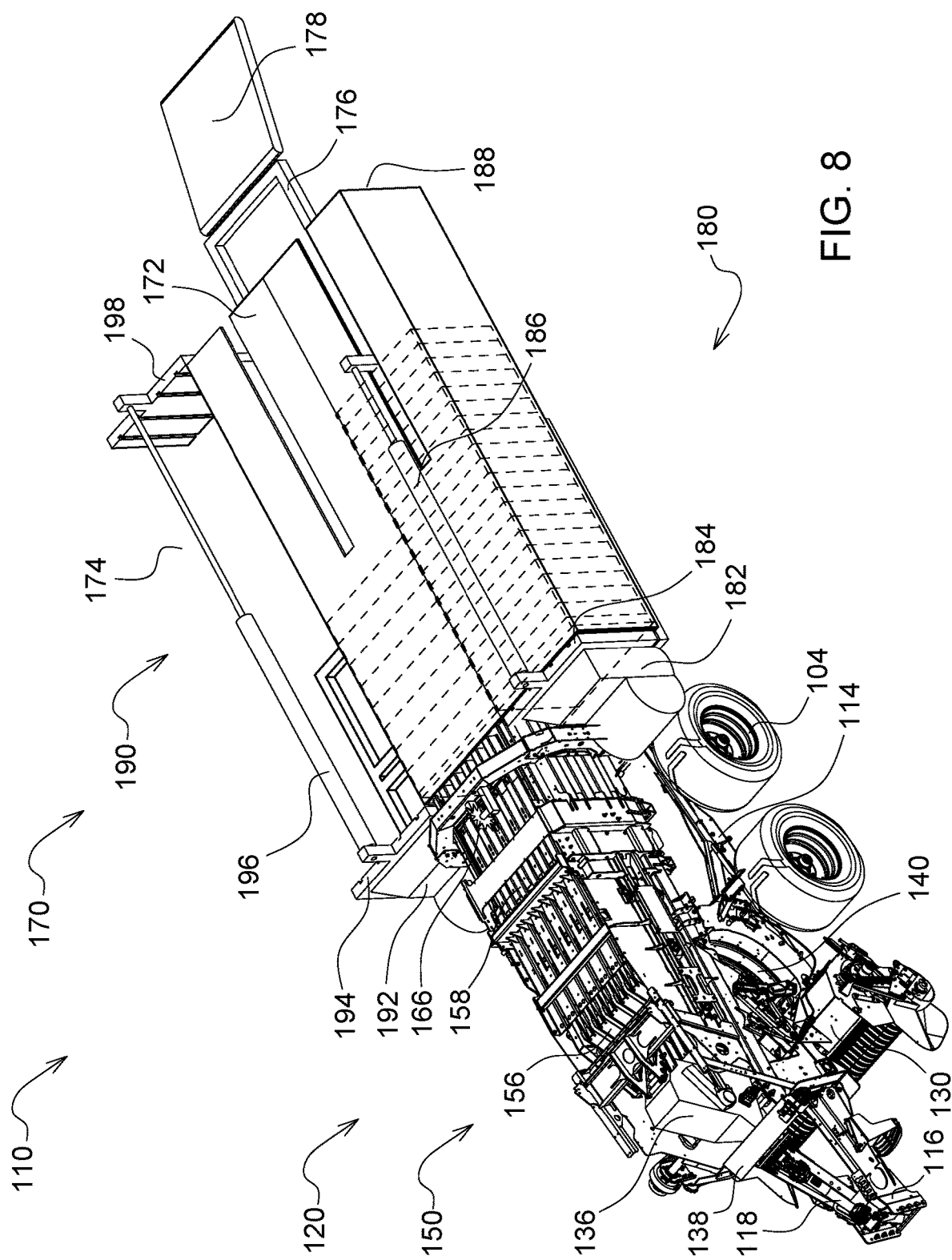
FIG. 8 is a front perspective view of an agricultural harvesting machine, according to an embodiment.
Figure 9:
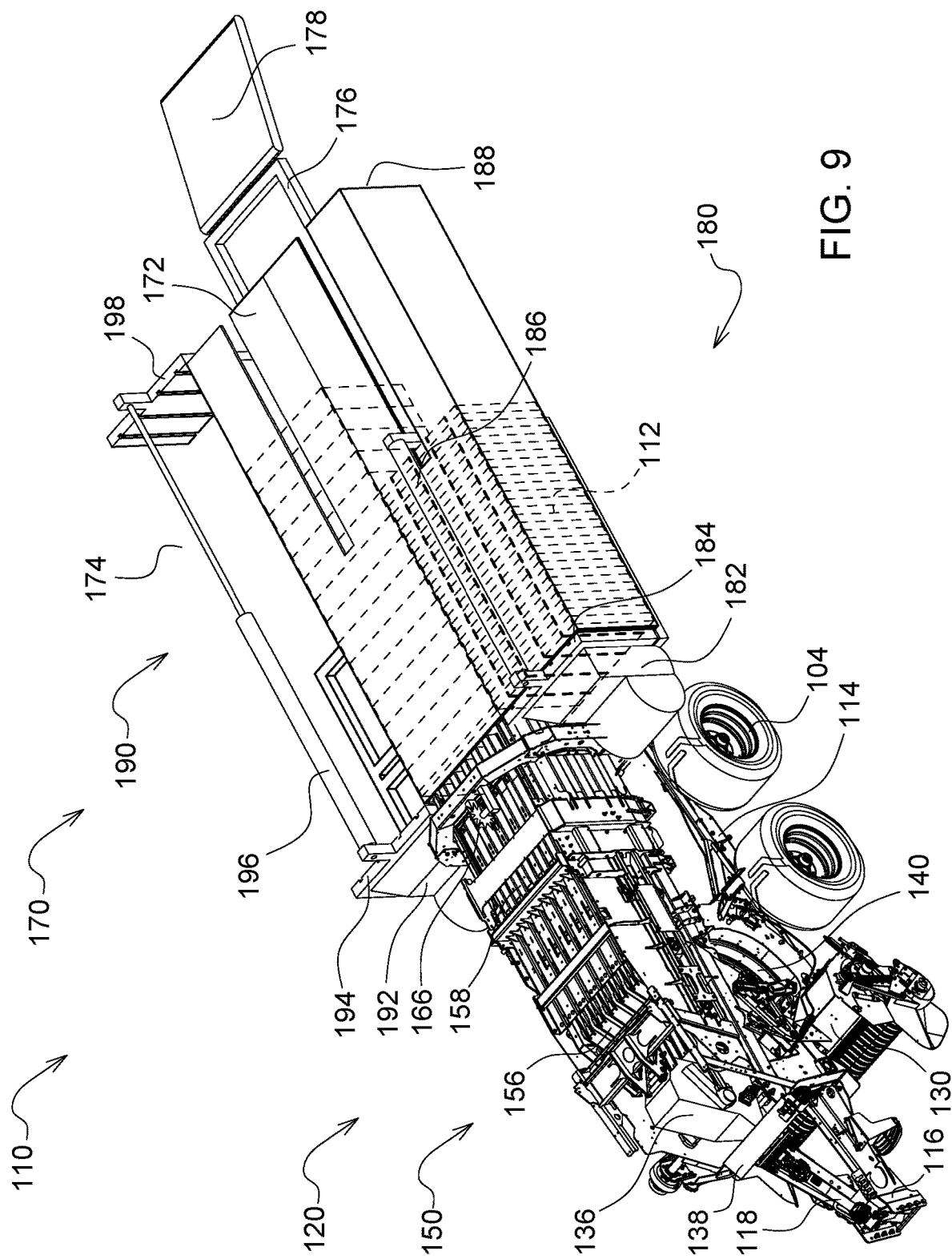
FIG. 9 is a front perspective view of an agricultural harvesting machine, according to an embodiment.
Figure 10:
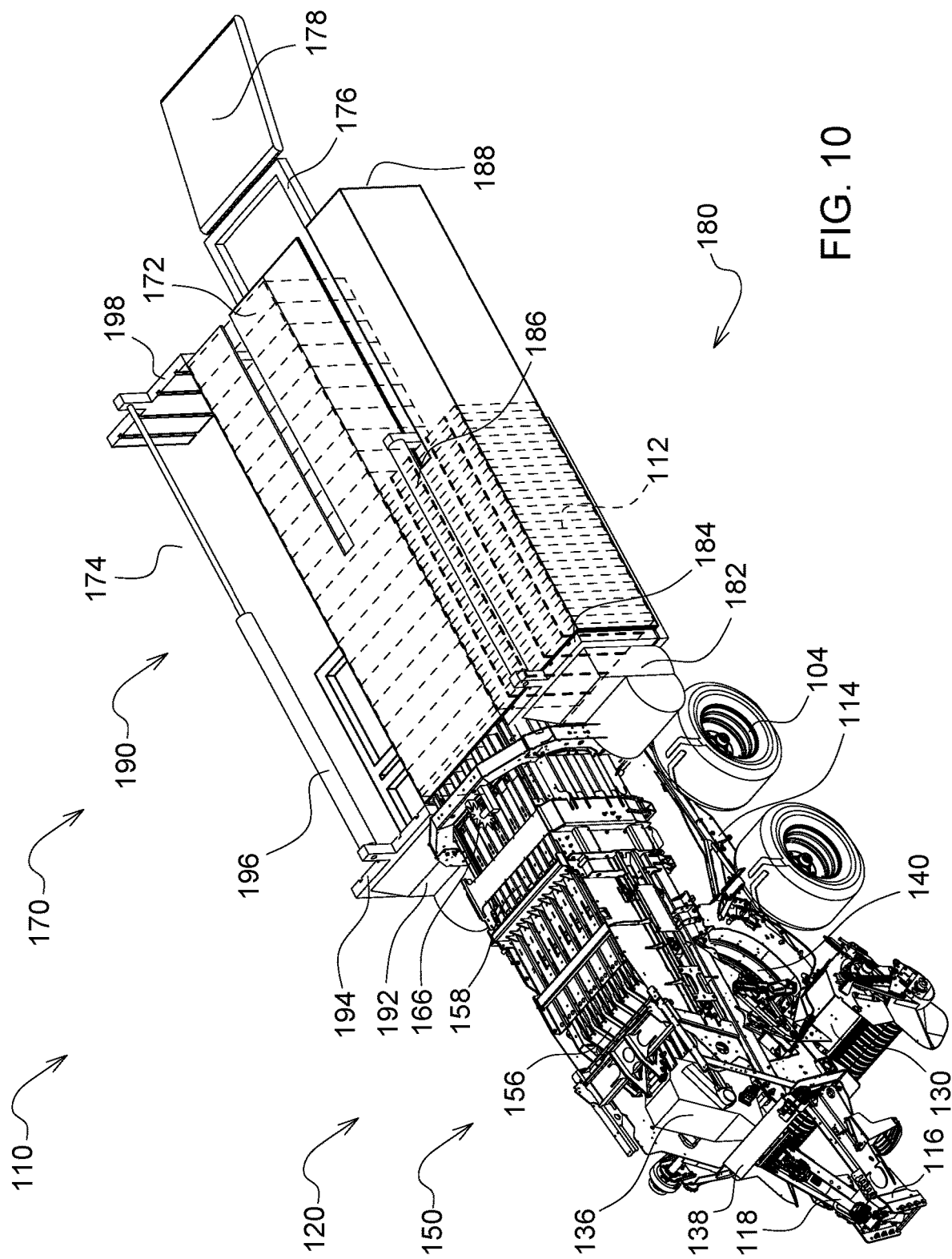
FIG. 10 is a front perspective view of an agricultural harvesting machine, according to an embodiment.
Figure 11:
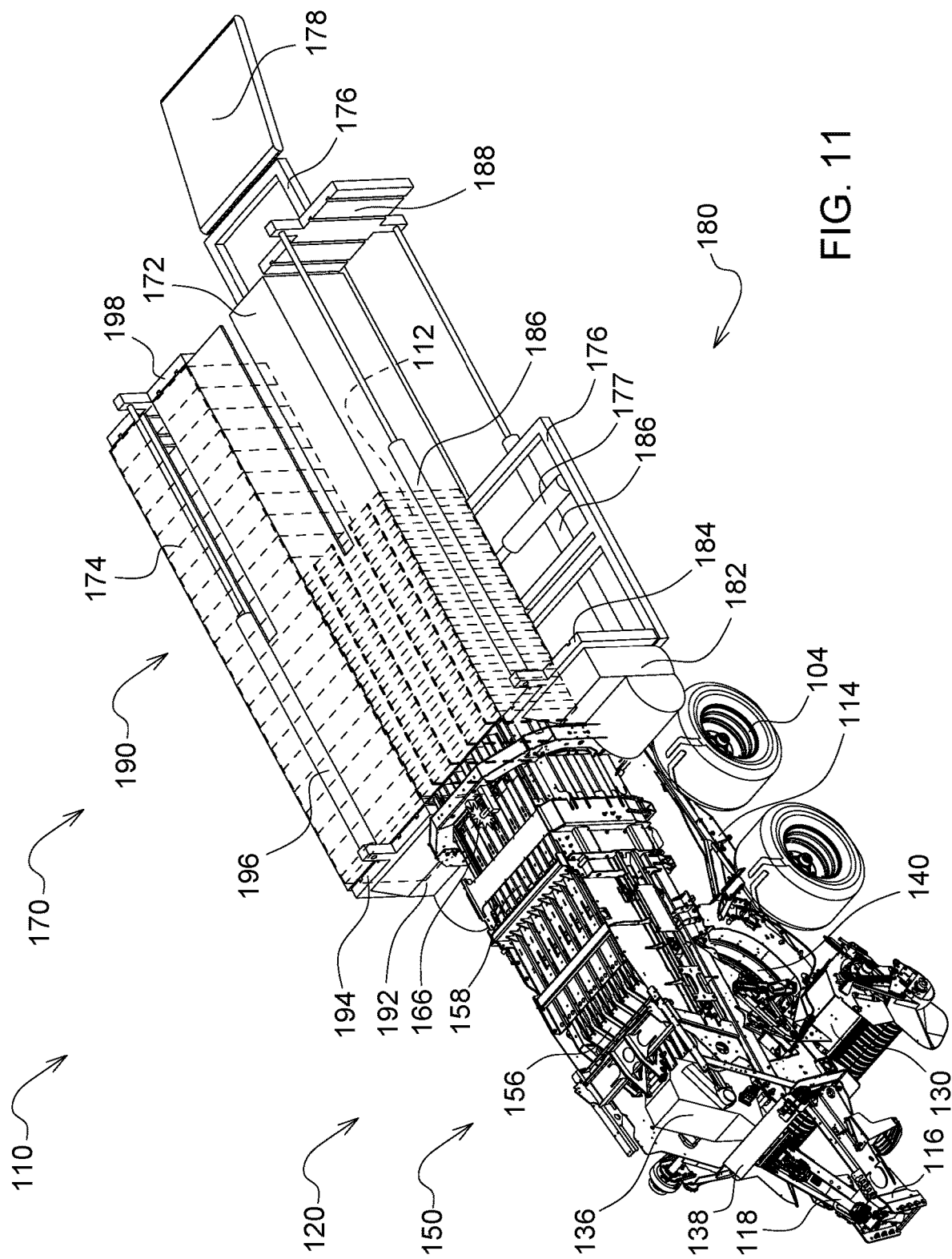
FIG. 11 is a front perspective view of an agricultural harvesting machine, according to an embodiment.
Figure 12:
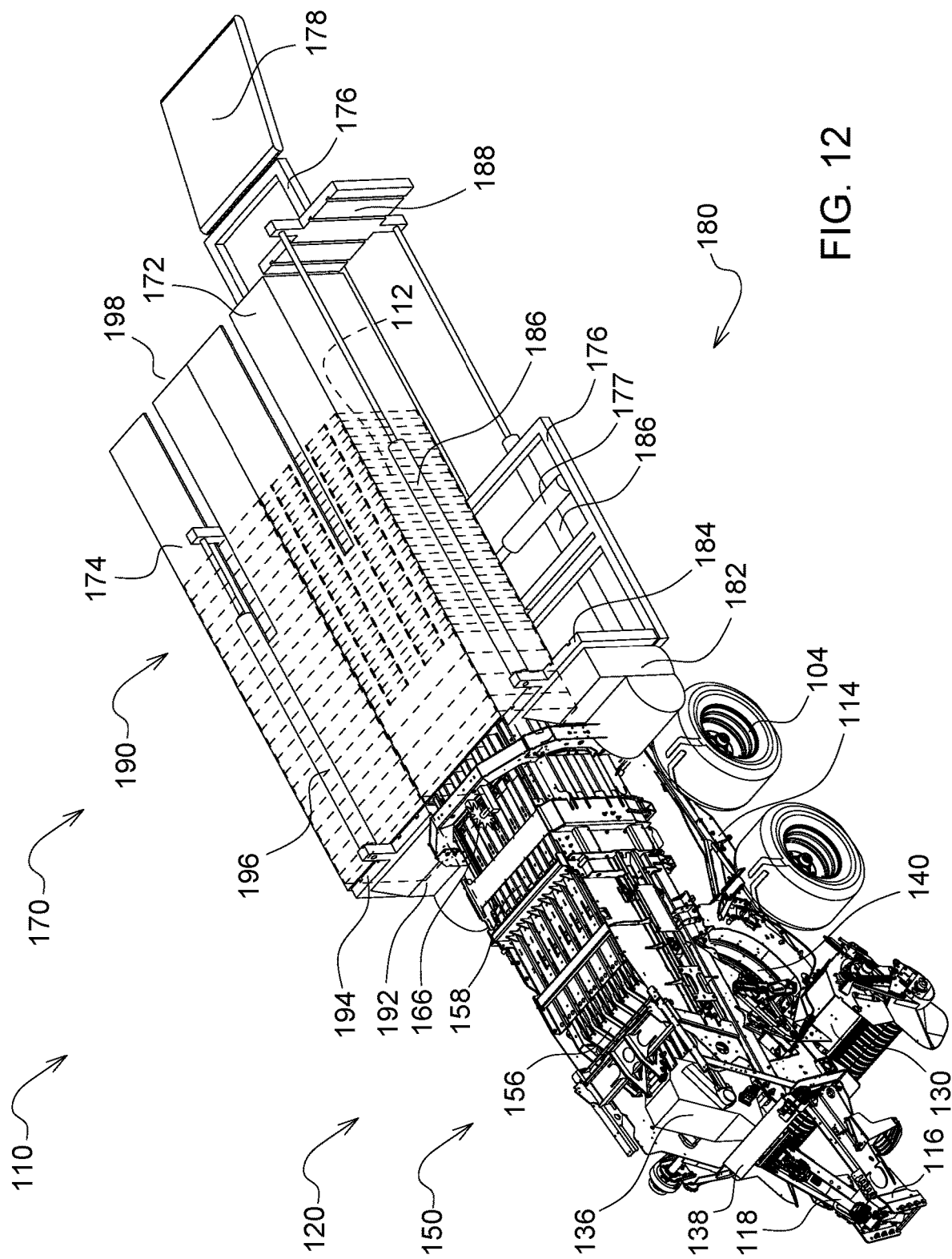
FIG. 12 is a front perspective view of an agricultural harvesting machine, according to an embodiment.
Figure 13:
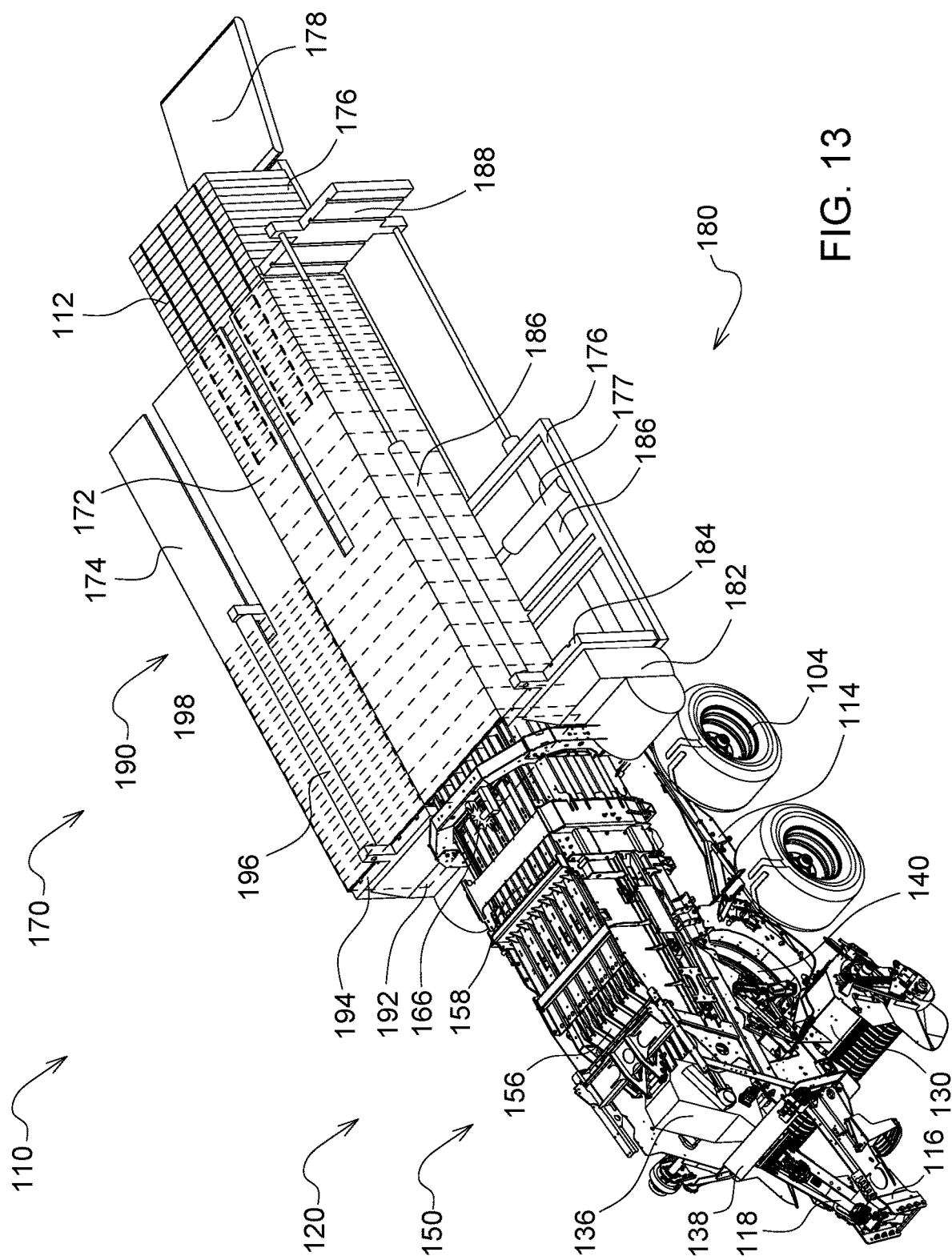
FIG. 13 is a front perspective view of an agricultural harvesting machine, according to an embodiment.

When the crop material in the first compartment 172 has reached the desired or selected density, the binding system 182 binds the crop material into a crop package or crop package 112 while the crop material continues to fill the second compartment 174 from the compression chamber 158, as shown in FIG. 8. When the second compartment 174 is filled to the desired or predetermined level, as shown in FIG. 9, the first and second compartments 172, 174 move or transfer back to the right so that the first compartment 172 is aligned or operatively associated with the compression chamber 158 and the second compartment 174 is aligned or operatively associated with the compression mechanism 190, as shown in FIG. 10. The first compartment 172 replaces the second compartment 174 behind the compression chamber 158. The crop material from the compression chamber 158 begins to transfer into the first compartment 172 moving or pushing the crop package 112 rearward, and the one or more compression devices 196 move the movable wall 198 towards the stationary wall 194 compressing the crop material in the second compartment 174, as shown in FIGS. 11 and 12. With reference to FIG. 13, the binding system 192 binds the crop material into a crop package or crop package 112 when the crop material in the second compartment 174 has reached to desired or selected density. At the same time the crop material from the compression chamber 158 continues to fill the first compartment 172, which continues to move or push the crop package 112 rearward until the first compartment 172 is filled and the crop package 112 is ejected.

The baler 110 with the multiple stage compression system described herein requires less power than a single stage compression system to compress crop material into a similar density crop package 112. The multiple stage compression system can operate with a lower power requirement because the first and second stage compression systems 120, 170 can operate concurrently or simultaneously. The second compression mechanism 180 can operate at the same time as the first compression mechanism 150 allowing more time for the second compression mechanism 180 to compress the crop material to a higher density. The first compression mechanism 150 can continually compress crop material and alternately feed the crop material from the compression chamber 158 into either the second or second compartment 172, 174. The second compression mechanism 180 can compress the crop material in the first compartment 172 while crop material exiting the compression chamber 158 fills the second compartment 174, or vice versa. The second compression mechanism 180 can utilize the amount of time required to fill the second compartment 174 to compress the crop material in the first compartment 172. The two compartments 172, 174 in the second compression system 170 allow one of the compartments to provide temporary storage for crop material while the other compression chamber further compresses crop material.

Figure 15:
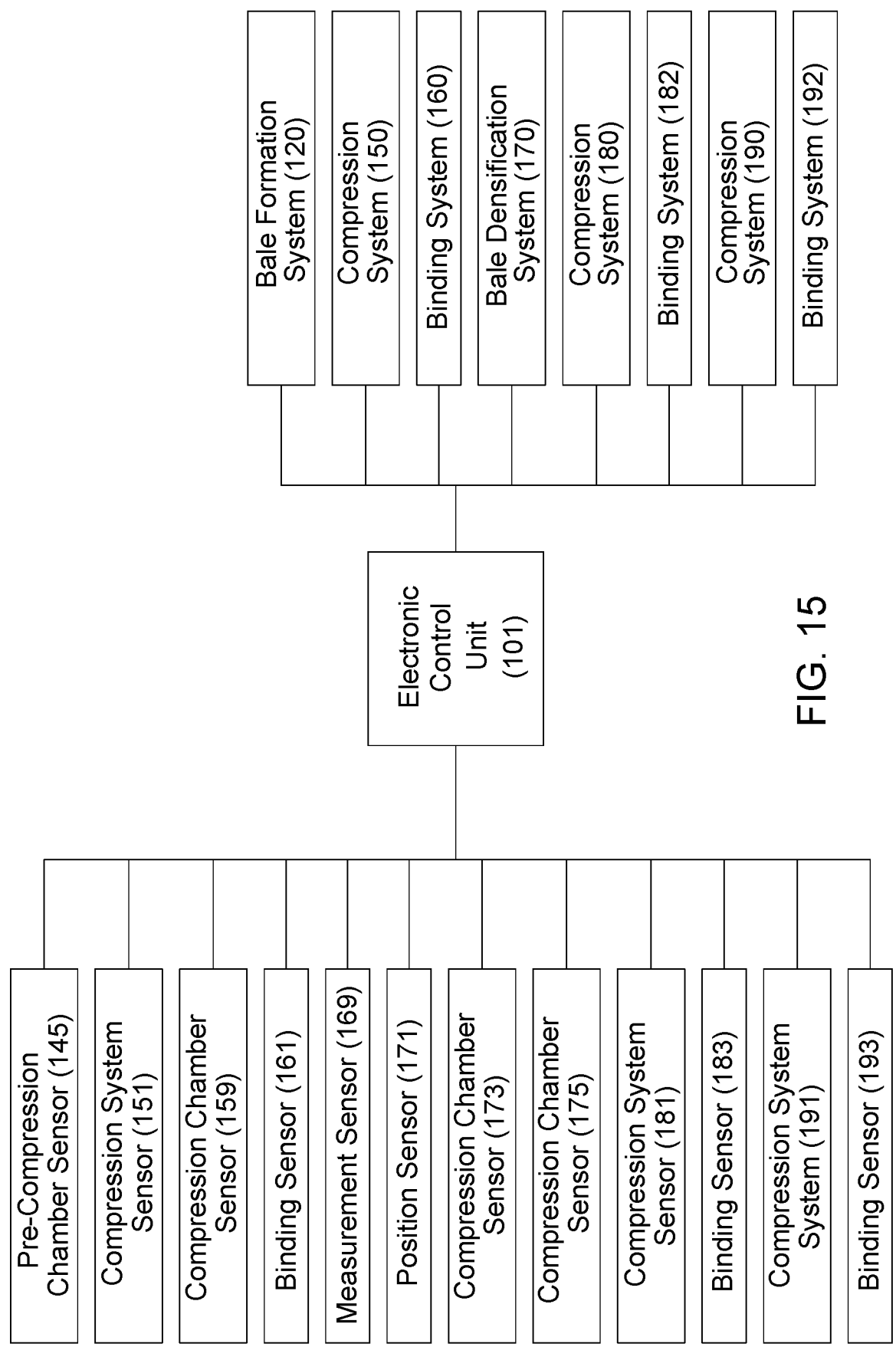
FIG. 15 is a schematic diagram of a control system for an agricultural harvesting machine, according to one embodiment.
Figure 16:
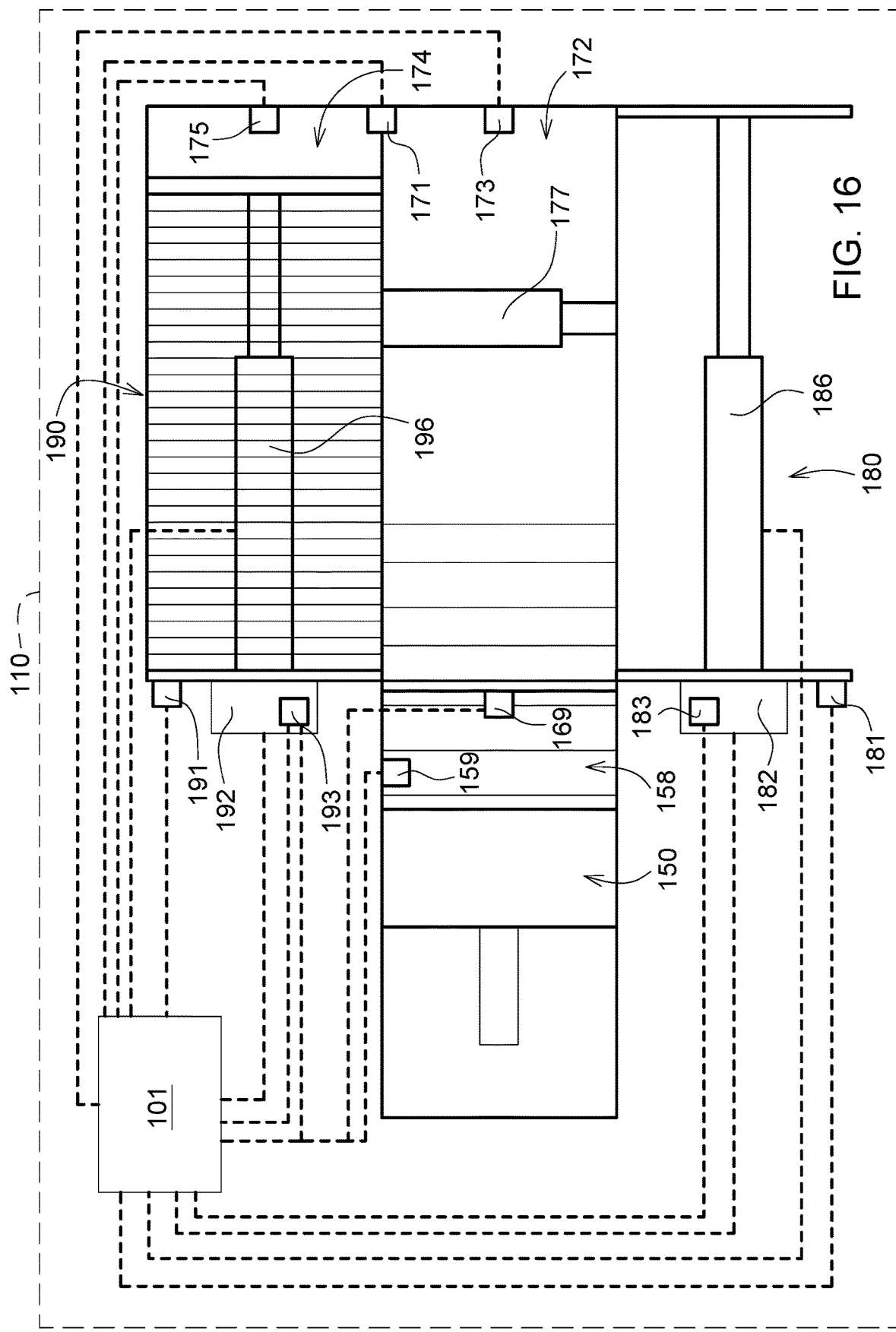
FIG. 16 is a schematic diagram of an agricultural harvesting machine, according to one embodiment.

With reference to FIGS. 15 and 16, the baler 110 may include an electronic control unit 101, or controller, having one or more microprocessor-based electronic control units or controllers, which perform calculations and comparisons and execute instructions. The controller 101 may include a processor, a core, volatile and non-volatile memory, digital and analog inputs, and digital and analog outputs. The controller 101 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The controller 101 may receive communication or signals, via electrically or any suitable electromagnetic communication, from one or more devices, determine an appropriate response or action, and send communication or signals to one or more devices. The controller 101 can be a programmable logic controller, also known as a PLC or programmable controller. The controller 101 may connect to a baler 110 electronic control system through a data bus, such as a CAN bus, or the controller 101 can be a part of the baler 110 electronic control system.

With continued reference to FIGS. 15 and 16, the baler 110 can include one or more of the following sensors. Any of the following sensors can be individual or multiple sensors, which can be the same or different types of sensors. A pre-compression chamber sensor 145 may be positioned in, on, or near the pre-compression chamber 140 and can be any type of sensor which senses a fill condition (e.g., quantity, density, etc. of the crop material in the pre-compression chamber 140) of the pre-compression chamber 140. A first compression system sensor 151 can be positioned anywhere on or near the first compression mechanism 150 and can be any type of sensor which senses one or more of status, position, and compression of the first compression mechanism 150. A second compression system sensor 181 can be positioned anywhere on or near the second compression mechanism 180 and can be any type of sensor which senses one or more of status, position, and compression of the second compression mechanism 180. A third compression system sensor 191 can be positioned anywhere on or near the second compression mechanism 190 and can be any type of sensor which senses one or more of status, position, and compression of the second compression mechanism 190.

A binding sensor 161 may be positioned in, on, or near the binding system 160 and can be any type of sensor which senses the status of the binding system 160. A binding sensor 183 may be positioned in, on, or near the binding system 180 and can be any type of sensor which senses the status of the binding system 180. A binding sensor 193 may be positioned in, on, or near the binding system 190 and can be any type of sensor which senses the status of the binding system 190. A measurement sensor 169 may be positioned on or near the measuring device 168 and can be any type of sensor which senses when the crop material within the compression chamber 140 has reached a pre-determined quantity.

A compression chamber sensor 159 can be positioned in, on, or near the compression chamber 158 and can be any type of sensor which senses the quantity, density, or both, of the crop material in the compression chamber 158. A first compartment sensor 173 can be positioned in, on, or near the first compartment 172 and can be any type of sensor which senses one or more of the quantity, density, and compression of the crop material in the first compartment 172. A second compartment sensor 175 can be positioned in, on, or near the second compartment 174 and can be any type of sensor which senses one or more of the quantity, density, and compression of the crop material in the second compartment 174. A position sensor 171 can be positioned in, on, or near the crop package densification system 170 and can be any type of sensor which senses the position or location of the crop package densification system 170. The position sensor 171 can sense the relative position or orientation of the first and second compartments 172, 174.

The controller 101 may be in communication to send and receive signals, information, instructions, and commands with one or more devices including, but not limited to: the pre-compression chamber sensor 145 to receive quantity, density, or fill information of the crop material in the pre-compression chamber 140; the one or more compression mechanism sensors 151, 181, 191 to receive status, position, or compression information of the one or more respective compression mechanisms 150, 180, 190; the one or more binding sensors 161, 183, 193 to receive the status of the respective binding system 160, 182, 192; the measurement sensor 169 to receive quantity, compression, or fill information of the crop material in the compression chamber 158; the one or more compression chamber sensors 159 to receive the quantity or density information of the crop material in the compression chamber 158; the one or more compartment sensors 173, 175 to receive the quantity or density information of the crop material in the respective compartments 172, 174; the crop package formation system 120 to send and receive information and instructions for the first stage of the compression process; the crop package densification system 170 to send and receive information and instructions for the second stage of the compression process; the one or more compression systems 150, 180, 190 to send and receive information and instructions for the compression process; and the one or more binding systems 160, 182, 192 to send and receive information and instructions for the binding process.

Figure 17:
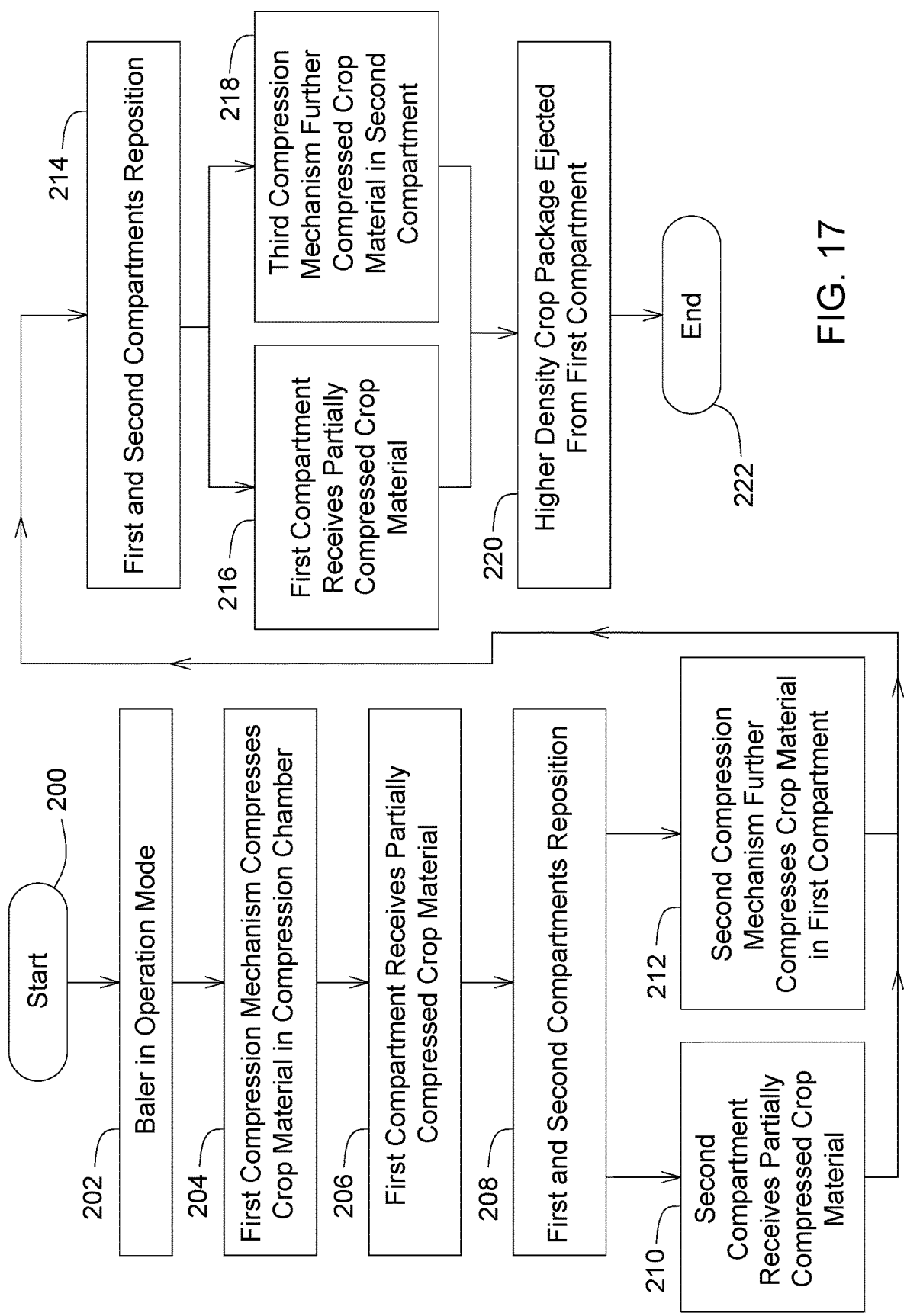
FIG. 17 is a flow chart for a method of operating a multiple stage compression system in an agricultural harvesting machine, according to one embodiment.

FIG. 17 illustrates a method of operating a baler 110 having a multiple stage compression system, which may be implemented in one or more of the embodiments described herein and depicted in the various FIGURES. At step 200, the method starts.

At step 202, the baler 110 is in an operation mode and the pickup mechanism 130 gathers crop material from the field and feeds it to the pre-compression chamber 140. The controller 101 can determine when the pre-compression chamber 140 has attained the pre-determined fill condition based at least partially upon the output from the pre-compression chamber sensor 145. Once the pre-determined fill condition of the pre-compression chamber 140 is attained, the loading mechanism 142 moves the crop material from the pre-compression chamber 140 into the compression chamber 158.

At step 204, the first stage compression system or crop package formation system 120 at least partially compresses and forms the crop material received from the pre-compression chamber 140. The compression device 156 at least partially compresses and forms the crop material in the compression chamber 158. The partially compressed crop material moves rearward through the compression chamber 158 as the compression device 156 continues to compress additional crop material. When crop material attains the desired or predetermined size, density, or both, based at least partially upon output from the compression chamber sensor 159, measurement sensor 169, or both, the crop package formation system 120 releases the crop material from the compression chamber 158.

At step 206, the first compartment 172 of the crop package densification system 170 receives the at least partially compressed crop material exiting from the compression chamber 158, as shown in FIG. 2. The first compartment 172 continues to receive crop material until the selected or predetermined quantity is attained based at least partially on the first compartment sensor 173.

At step 208, when the first compartment 172 is filled to the desired capacity, as shown in FIG. 6, the actuator 177 moves the first and second compartments 172, 174 laterally so that the first compartment 172 is aligned or operatively associated with the second compression mechanism 180 and the second compartment 174 is aligned or operatively associated with the compression chamber 158, as shown in FIG. 7, based at least partially on the position sensor 171.

At step 210, the second compartment 174 of the crop package densification system 170 begins receiving the at least partially compressed crop material exiting from the compression chamber 158, as shown in FIG. 8. The second compartment 174 continues receiving the at least partially compressed crop material from the compression chamber 158 until the selected or predetermined quantity is attained based at least partially on the second compartment sensor 175, as shown in FIG. 10.

At step 212, while the second compartment 174 continues receiving crop material, the second compression mechanism 180 begins further compressing the crop material in the first compartment 172, as shown in FIG. 9. The one or more compression devices 186 move the movable wall 188 towards the stationary wall 184 further compressing the crop material in the first compartment 172. When the crop material reaches the desired density, size, or both based at least partially on the compartment sensor 173, compression system sensor 181, or both, the binding system 182 then binds the compressed crop material into a crop package 112 in the first compartment 172.

At step 214, when the second compartment 174 is filled to the desired capacity, the actuator 177 moves the first and second compartments 172, 174 laterally so that the second compartment 174 is aligned or operatively associated with the third compression mechanism 190 and the first compartment 172 is aligned or operatively associated with the compression chamber 158, as shown in FIG. 11, based at least partially on the position sensor 171.

At step 216, the first compartment 172 begins receiving the at least partially compressed crop material from the compression chamber 158, which moves or pushes the crop package 112 rearward, as shown in FIG. 12. The first compartment 172 continues to receive crop material until the selected or predetermined quantity is attained based at least partially on the first compartment sensor 173.

Figure 14:
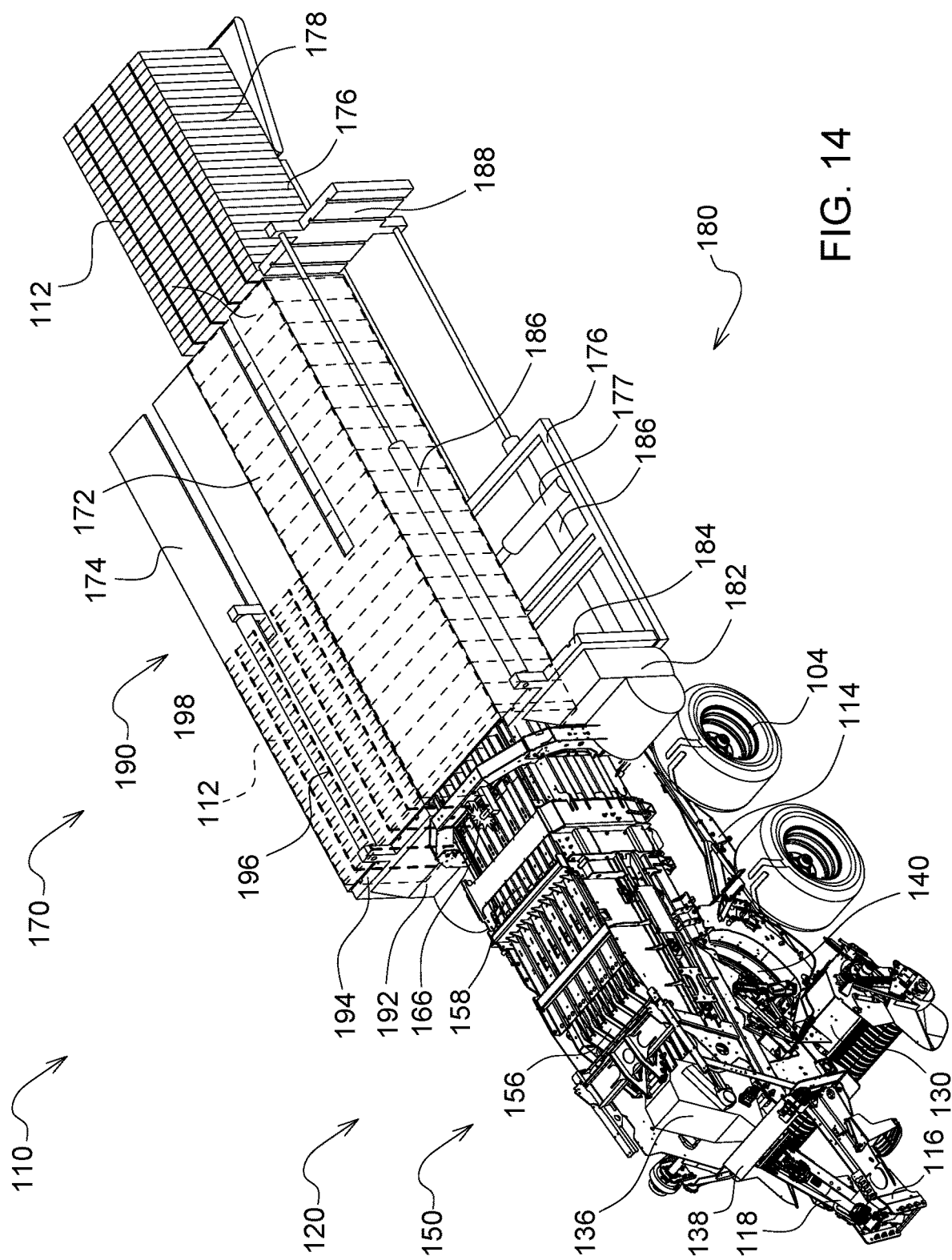
FIG. 14 is a front perspective view of an agricultural harvesting machine, according to an embodiment.

At step 218, while the first compartment 172 continues receiving crop material, the third compression mechanism 190 begins further compressing the crop material in the second compartment 174, as shown in FIG. 13. The one or more compression devices 196 move the movable wall 198 towards the stationary wall 194 further compressing the crop material in the second compartment 174. When the crop material reaches the desired density, size, or both based at least partially on the compartment sensor 175, compression system sensor 191, or both, the binding system 192 then binds the compressed crop material into a crop package 112 in the second compartment 174, as shown in FIG. 14.

At step 220, as the first compartment 172 accumulates the desired fill level or condition, the crop package 112 continues moving rearward until the accumulated crop material ejects the crop package 112 from the first compartment 172.

At step 222, the operation of the multiple stage compression system of the baler 110 has occurred, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments or implementations disclosed herein is a high level of compression, densification, or compaction of the crop material utilizing a multiple stage compression system with lower power requirements than with a single stage compression system. The two-stage compression system provides more time for the second stage to further compress the crop material because the first and second stage compression systems operate concurrently or simultaneously. The additional time to compress the crop material to the desired density reduces the amount of power required.

The terminology used herein is for describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. An agricultural harvesting machine having a multiple stage compression system comprising:
   a pickup mechanism which gathers a crop material from an associated ground surface;
   a first compression system including a first compression mechanism which partially compresses a first portion of the crop material received from the pickup mechanism in a compression chamber;
   a second compression system including first and second compartments each having at least one open end and positioned rearward of the compression chamber, the second compression system having a first position in which the second compartment is aligned with the compression chamber and the first compartment is operatively positioned with a second compression mechanism, the second compression system having a second position in which the second compartment is operatively positioned with a third compression mechanism and the first compartment is aligned with the compression chamber, and the second compression system including a first binding system operatively associated with the second compression mechanism; and
   at least one actuator operably connected to one of the first and second compartments to move the first and second compartments perpendicular to a direction of movement of the first portion of the crop material exiting the compression chamber between the first and second positions.

2. The agricultural harvesting machine of claim 1, wherein the first and second compartments remain adjacent to each other in both the first and second positions.

3. The agricultural harvesting machine of claim 1, wherein the first and second compartments move independently of each other.

4. The agricultural harvesting machine of claim 1, wherein the compression chamber and the first and second compartments are all positioned in a same plane.

5. The agricultural harvesting machine of claim 1, wherein the second compression mechanism includes a stationary barrier and at least one actuator which moves a moveable barrier towards the stationary barrier to compress the first portion of the crop material in the first compartment.

6. The agricultural harvesting machine of claim 1, wherein the first binding system is operable to bind the first portion of the compressed crop material in the first compartment into a first crop package with a higher density than a second portion of the crop material exiting the compression chamber.

7. The agricultural harvesting machine of claim 1, wherein the third compression mechanism includes a stationary barrier and at least one actuator which moves a moveable barrier towards the stationary barrier to compress a second portion of the crop material in the second compartment.

8. The agricultural harvesting machine of claim 7, further comprising:

a second binding system operable to bind the second portion of the crop material in the second compartment into a second crop package with a higher density than a third portion of the crop material exiting the compression chamber.

9. The agricultural harvesting machine of claim 8, wherein the third portion of the crop material exiting the compression chamber pushes the first crop package out of the first compartment.

10. A method of compressing crop material in an agricultural harvesting machine comprising:
gathering a first portion of crop material with a pickup mechanism from an associated ground surface;
compressing the first portion of crop material in a compression chamber received from the pickup mechanism;
transferring the first portion of crop material from the compression chamber to a first compartment;
replacing the first compartment with a second compartment by moving the compartments in a lateral direction, the first and second compartments each having at least one open end;
transferring a second portion of crop material from the compression chamber to the second compartment while concurrently further compressing the first portion of crop material in the first compartment; and
binding the first portion of crop material in the first compartment.

11. The method of claim 10, wherein replacing the first compartment with a second compartment further comprises maintaining the first and second compartments adjacent to each other.

12. The method of claim 10, wherein the first and second compartments move independently of each other.

13. The method of claim 10, wherein the compression chamber and the first and second compartments are all positioned in a same plane.

14. The method of claim 10, wherein concurrently further compressing the first portion of crop material in the first compartment further comprises moving a moveable barrier towards a stationary barrier via at least one actuator to compress the first portion of crop material in the first compartment.

15. The method of claim 10, wherein replacing the first compartment with a second compartment occurs when the first compartment has attained a predetermined fill condition.

16. The method of claim 10, wherein binding the first portion of crop material in the first compartment binds the compressed first portion of crop material into a first crop package with a higher density than the second portion of the crop material exiting the compression chamber.

17. The method of claim 10, wherein replacing the first compartment with a second compartment further comprises moving the first and second compartments perpendicular to a direction of movement of the crop material exiting the compression chamber via at least one actuator.

18. The method of claim 10, further comprising:
replacing the second compartment with the first compartment by moving the compartments in a lateral direction perpendicular to a direction of movement of the crop material exiting the compression chamber after binding the first portion of crop material in the first compartment.

19. The method of claim 18, further comprising:
pushing the first crop package out of the first compartment via a third portion of the crop material exiting the compression chamber.

\* \* \* \* \*